(12) United States Patent
Tsukihashi

(10) Patent No.: US 7,020,060 B2
(45) Date of Patent: Mar. 28, 2006

(54) DISC RECORDING APPARATUS AND DISC

(75) Inventor: Akira Tsukihashi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 384 days.

(21) Appl. No.: 10/078,189

(22) Filed: Feb. 15, 2002

(65) Prior Publication Data

US 2002/0126608 A1    Sep. 12, 2002

(30) Foreign Application Priority Data

Mar. 12, 2001 (JP) ............................ 2001-068565
Feb. 1, 2002 (JP) ............................ 2002-025066

(51) Int. Cl.
*G11B 7/24* (2006.01)
(52) U.S. Cl. ................... 369/53.24; 369/275.3
(58) Field of Classification Search ............ 369/47.31, 369/53.24, 59.25
See application file for complete search history.

(56) References Cited

U.S. PATENT DOCUMENTS 6,469,961 B1 * 10/2002 Akiyama et al. ........ 369/44.13
6,850,473 B1 * 2/2005 Toyota ..................... 369/53.24
2002/0012300 A1 * 1/2002 Kim ....................... 369/47.31
2002/0136137 A1 * 9/2002 Shishido et al. ......... 369/59.25

FOREIGN PATENT DOCUMENTS

| EP | 0 908 885 | 4/1999 |
| EP | 908885 A2 * | 4/1999 |
| JP | 2000099397 A * | 4/2000 |
| JP | 2000-149451 | 5/2000 |
| JP | 2000149451 A * | 5/2000 |
| JP | 2001-357627 | 12/2001 |
| JP | 2002-25064 | 1/2002 |
| JP | 2002025064 A * | 1/2002 |

OTHER PUBLICATIONS

XP002247461 (JP 2001-006293), Jan. 12, 2001, Japan.

* cited by examiner

*Primary Examiner*—Brian Miller
*Assistant Examiner*—Peter Vincent Agustin
(74) *Attorney, Agent, or Firm*—Hogan & Hartson, L.L.P.

(57) ABSTRACT

A CPU (50) generates a real recording address y from $y=n(x-m)+m$, where absolute time x is obtained from an ATIP decoder (48). Recording density scale factor is denoted by n and recording start address is denoted by m. Using the real recording address y, an encoder (40) performs encoding and data recording is performed.

22 Claims, 1 Drawing Sheet

DISC RECORDING APPARATUS AND DISC

BACKGROUND OF THE INVENTION

1. Field of the Invention

The present invention relates to a disc recording apparatus for recording data at a high density and to a disc recorded in this manner.

2. Description of the Related Art

Heretofore available in the CD (Compact Disc) family are the writable CD-R (CD Recordable) and CD-RW (CD ReWritable), and the writing of data to these discs can be performed by the user.

For this purpose, a pregroove is formed as a guide for the recording of information on the CD-R and CD-RW. The pregroove includes a predetermined FM modulated wobble. Demodulating the wobble frequency yields ATIP (Absolute Time In Pregroove), which is the absolute time information.

Furthermore, on a CD, a time code indicating the current time information is recorded in each sector within the subcode in the recorded information. During playback, the current time information within this subcode is referenced so that playback is then performed at the correct speed.

In this manner, using the CD-R or CD-RW, a CD can be created that is playable on an ordinary music CD player.

CDs have a standard recording capacity of 650 MB. On the other hand, it is desirable to increase the recording capacity as much as possible. Various recording media are available, and if a medium of another format is used, it is also possible to record more information. However, it is also desirable to increase the recording capacity as well as use the CD for extended playback in conventional CD players.

SUMMARY OF THE INVENTION

It is therefore an object of the present invention to provide a disc and a disc recording apparatus capable of creating a CD that can be increased in recording capacity and is also playable on an ordinary CD player.

The present invention receives information regarding the maximum recording time or recording density, determines the scale factor n of the recording density on the basis of the received information, and records recording data onto a disc with recording address y calculated from $y=n(x-m)+m$, where x is the absolute time address generated on the basis of the pregroove formed on a disc, n is the scale factor of the recording density, and m is the recording start address.

In this manner, the present invention sets the recording density according to information supplied from an external source (for example personal computer). Therefore, recording is possible at an arbitrary recording density. Although it is preferable for the set recording density to exceed 1, a value less than 1 is also allowed. By recording data at a scale factor exceeding 1 with respect to the absolute time from the pregroove, high density recording becomes possible. Namely, high density recording becomes possible for a CD medium formed with an ordinary pregroove. On the other hand, by recording data at a desired scale factor of less than 1, it is possible to improve the recording quality. Furthermore, during playback, by controlling the reading process from the time information of the subcode information in the recording data, playback becomes possible also on an ordinary CD player.

Furthermore, it is preferable to have means for comparing the information regarding the received recording capacity and a predetermined maximum recording capacity. If a disc has been recorded with approximately 20% more data than the standard recording capacity for that disc, the disc can be played on an ordinary CD player. By confirming the recording capacity, the creation of a CD that cannot be played back on an ordinary CD player can be prevented.

Furthermore, in the case where a predetermined maximum storage capacity is exceeded in the comparison between the received information regarding the storage capacity and the maximum storage capacity, it is preferable to send data indicating that recording is impossible. This allows the storage capacity to be changed at the data supply side.

Furthermore, it is preferable to include means for comparing the above-mentioned received information regarding the storage capacity and two predetermined maximum storage capacities. The storage capacity can be set in accordance with compatibility requirements by including a maximum storage capacity within a range where read compatibility is maintained and a storage capacity at which storage is possible yet compatibility cannot be maintained.

Furthermore, the disc relating to the present invention is recorded with data by receiving information regarding the maximum recording time or recording density, determining the scale factor n of the recording density on the basis of the received information, and using recording address y calculated from $y=n(x-m)+m$, where x is the absolute time address generated on the basis of the pregroove formed on the disc, n is the scale factor of the recording density, and m is the recording start address.

DETAILED DESCRIPTION OF THE PREFERRED EMBODIMENTS

Figure 1:
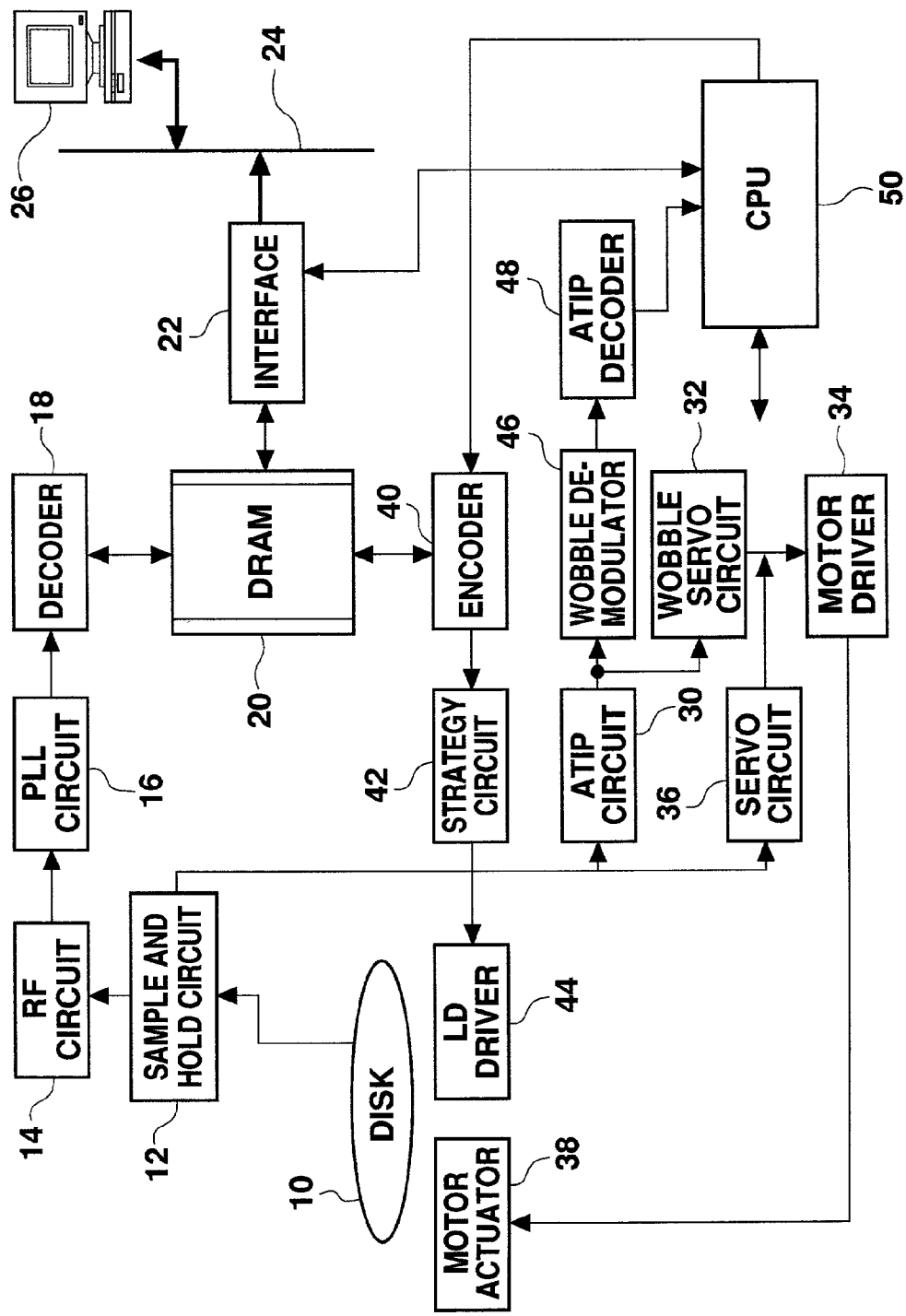
FIG. 1 shows the overall configuration of the system.

An embodiment of the present invention will be described hereinafter with reference to the drawing.

FIG. 1 shows the overall system including a disc recording apparatus of the embodiment. Reflected light from a disc 10 is read by an optical head and the read signal is supplied to an RF circuit 14 via a sample and hold circuit 12. The RF circuit 14 performs processing, such as amplification and wave-shaping, on the read signal, and supplies it to a PLL circuit 16. The PLL circuit 16 regenerates a clock from the read signal and supplies the read signal and the clock to a decoder 18. The decoder 18 uses the clock from the read signal to recover the data by extracting the encoded data and performing a predetermined decoding process. The recovered data is sent to a DRAM 20 where it is stored. The processing in the decoder 18 also uses the DRAM 20 as a storage area.

The recovered data is supplied to a computer 26 via an interface 22 and a communication line 24.

The output of the sample and hold circuit 12 is supplied to an ATIP circuit 30 where a signal of the wobble frequency is selected, then supplied to a wobble servo circuit 32. On the basis of the wobble frequency, the wobble servo circuit 32 generates and supplies to a motor driver 34 a control signal for rotational control of a spindle motor. Furthermore, the output of the sample and hold circuit 12 is also supplied to a servo circuit 36 where a control signal is generated for positional control of the optical head. This signal is also supplied to the motor driver 34.

The motor driver 34 controls the spindle motor and the head drive motor via a motor actuator 38, and performs control of the spindle motor rotational speed and of the head position.

When writing data to the disc 10, the write data from the computer 26 is written to the DRAM 20 via the communication line 24 and the interface 22. The data read from the DRAM 20 is supplied to an encoder 40 where it undergoes various data processing, such as subcode and error correction code addition and interleaving, then it is supplied to a strategy circuit 42. The strategy circuit 42 converts the supplied data to a pulse signal and supplies it to an LD driver 44. The LD driver 44 drives a light emitting element for writing data to the disc 10.

At this time, the write data must be written to the disc 10 in a predetermined format and density. During the writing process, the output of the ATIP circuit 30 is supplied to a wobble demodulator 46 where the wobble signal is demodulated. The demodulated wobble signal is then supplied to an ATIP decoder 48 where ATIP information, which is the absolute time information, is decoded. Namely, the absolute time information of the disc written in advance in the pregroove on the disc 10 is obtained at the ATIP decoder 48.

If the ATIP information obtained at the ATIP decoder 48 is directly supplied to the encoder 40, the encoder 40 generates a recording address on the basis of the ATIP information, and in accordance with the recording address, the encode data is supplied to the light emitting element via the strategy circuit 42 and the LD driver 44 so that the data can be written. As a result, data can be written in synchronization with the ATIP that has been prerecorded in the pregroove. Therefore, the data written in this manner can be read as usual. The encoding process by the encoder 40 uses the DRAM 20 as a temporary storage area.

The apparatus of this embodiment does not directly generate the recording address corresponding to the ATIP information but determines the recording address on the basis of the recording density information that is input from an external source.

For example, the disc recording apparatus determines the normal disc storage capacity from the mounted disc to be written with data. Currently, two CD-R types of 650 MB and 700 MB are commercially available. The data that is read is then sent to the computer 26. The computer 26 informs the user of the normal storage capacity, such as via a display, and accepts a user input regarding the storage capacity.

On an ordinary CD player, data is read and playback is possible through automatic tracking even if the storage capacity is approximately 20% higher. Thus, inputs of a storage capacity of 780 MB for a 650 MB disc and 840 MB for a 700 MB disc are set to be acceptable. When specifying an input, the storage capacity may be accepted directly as data or as a percentage (%) data. Furthermore, for audio CDs, the time may be accepted.

Furthermore, in the above-mentioned example, as a method for setting the storage capacity, the storable capacity was accepted from the disc capacity. However, the entered storage capacity may also be checked with the disc capacity. For example, if a request from the computer 26 is for the storage of 740 MB of data when the storage capacity of the mounted disc is 650 MB, a coefficient of 1.14 (=740 MB/650 MB) is set. Then, it is judged whether the set coefficient is less than or equal to 1.2, which corresponds to 120%. If it is less than or equal to 1.2, the coefficient is set. In this case, the recording process for the disc recording apparatus is set from the coefficient 1.14 and the recording process is performed corresponding to this coefficient.

The computer 26 then sends this data to the disc recording apparatus. At the disc recording apparatus, it is checked whether the received data is within a predetermined maximum value. In this manner, if confirmation is performed at the disc recording apparatus, the check at the computer 26 can be omitted. Furthermore, although confirmation at the disc recording apparatus can also be omitted, it is better to be sure to perform confirmation at the disc recording apparatus for safety.

This confirmation may be performed by a CPU 50 on the basis of the data supplied from the interface 22. The allowable storage capacity may be stored in an appropriate storage means in the disc recording apparatus or supplied from the computer 26.

If the coefficient in the data supplied from the computer 26 exceeds 1.2, a response indicating that recording at this scale factor is not possible is returned to the computer 26. As a result, the scale factor can be set again.

Furthermore, in the case where a setting was made without consideration for compatibility with an ordinary CD player, even if the coefficient exceeds 1.2 provided it is less than or equal to a predetermined value (for example 2.0) at which recording has been determined to be possible, the setting is made at this scale factor without a response to the computer 26 indicating that recording at this scale factor is not possible.

Whether or not to consider compatibility is an issue for the user to decide. If the entered scale factor is between 1.2 and 2.0, the computer 26 should prompt the user asking whether compatibility is to be considered. In this case, data on whether or not to consider compatibility is included in the data from the computer 26. If compatibility is not to be considered, the disc recording apparatus sets a scale factor of 1.2 to 2.0, and if the value is larger, it returns a response indicating that the setting is not possible. Furthermore, the computer 26 sends the scale factor directly to the disc apparatus. If the scale factor at the disc apparatus is 1.2 to 2.0, information indicating that the recording will be incompatible should be provided to the computer 26, and the computer 26 should prompt the user and set accordingly as to whether an incompatible recording is to be performed or not. Furthermore, without performing this check in the case where the scale factor is 1.2 to 2.0, the scale factor may be set as is with an indication of incompatibility included.

Furthermore, it is possible to improve the recording quality by performing data recording with a scale factor less than 1. In particular, since it is desirable to record music data at high quality, the error rate can be reduced by setting the scale factor to a value less than 1.

Then, in this manner, on the basis of the storage capacity data supplied from the computer 26, the CPU 50 determines the scale factor of the recording density, from which the recording address is calculated. In accordance with the calculated recording address, the encoder 40 creates the write data.

The CPU 50 calculates the recording address y from $y=n(x-m)+m$ where x is the absolute time obtained on the basis of the ATIP information. Here, n is the scale factor of the recording density and is 1.2 if the recording density is 1.2 times. Furthermore, m is the recording start address where recording starts by varying the scale factor in the absolute time based on the ATIP information and is determined on the basis of the previous record data.

As a result, data is created at the encoder 40 by inserting y into the disc time in the subcode. The disc 10 is written to on the basis of the created data. However, in this case, n times of data is written per unit time on the basis of the absolute time x of the ATIP information so that the writing density to the disc 10 is n times.

To realize this, a method for setting the data writing speed (data transfer speed at the encoder 40) to n times and a method for setting the disc rotational speed to 1/n are known. It is preferable to perform both methods and set the total recording density to n times. For example, by setting the data writing speed to 1.1 times and the spindle rotational speed to 1/1.05, the recording density itself becomes 1.16 times.

For example, the CPU 50 may store a table beforehand, determine the spindle rotational speed and the data transfer speed from the encoder 40 in accordance with the scale factor data of the recording density supplied from the computer 26, send a relevant signal to the wobble servo circuit 32 and the encoder 40, and control the spindle rotational speed and the writing speed.

It is preferable to raise the writing density by reducing the writing spot diameter compared to the ordinary case within a readable range.

During playback, the real recording address y that has been written in the subcode is referenced. As a result, during playback, the current time is accurately known on the basis of the recorded data so that playback is performed at the correct speed.

In this manner, according to this embodiment, the real recording address is calculated and recorded in accordance with the recording density from the ATIP that was read. Therefore, high-density recording can be performed for the commonly used CD-R and CD-RW.

A disc recorded in the above-mentioned manner basically cannot be appended with another recording. This is due to the fact that a deviation will result in the ATIP address and the time information of the Q channel data (sub Q data) in the subcode in the recorded data. This embodiment makes it possible to append another recording in the following manner.

First, in the case where recording is interrupted, the interrupted position is set in advance to a position where the data is easily sliced. For example, it may be the position of the S0/S1 synchronization signal in the subcode block. In this manner, the interrupted recording position is not defined in the Orange Book but is defined by BURN-Proof as described in Japanese Patent Laid-Open Publication No. 2000-040302 or set to a position where the data is easily sliced.

When appending a recording, the interrupted position is first detected on the basis of the EFM signal obtained from the already recorded data. The address corresponding to one frame before the final frame of the EFM signal recorded on the disc immediately prior to the interruption is then detected. On the basis of the first detected frame synchronization signal after the address is detected, the channel pits are counted to detect the recording start position.

Furthermore, the operating clock used for system control is the playback clock obtained by playing the pit signal until the recording start position is detected. The operating clock used for system control switches to the recording clock used when recording the EFM signal at the point when the recording start address is detected, and recording is performed on the basis of this clock.

In this manner, since the interrupted position is determined as described above, for example, to be at the position of the S0/S1 synchronization signal in the subcode block, the final recording position is detected, the recording data is prepared, and writing of the data is performed subsequent to the final frame.

Furthermore, the writing process itself is performed in the same manner as described above. As a result, another recording can be appended without the need for detecting the recording position on the basis of the wobble signal from the pregroove.

In this manner, it is possible to append another recording in this embodiment. However, the pregroove itself formed on a blank CD may be the same as in the prior art. Thus, the same CD can be used at various recording densities.

In the case of disc-at-once recording, writing may be performed while ignoring the ATIP address, and in the case of playback, the playback speed may be set from the obtained EFM signal.

Furthermore, as in the DVD format, so that the absolute time in the lead-in area on the disc is not a negative value, there are instances where the recording is performed with an offset address in the top absolute time address of the user recording area. Namely, the top address of the user recording area becomes the offset address.

If this sort of offset address is present, a recording address z is calculated by the CPU 50 as z=y+p, where p is the offset address. According to the calculated recording address z, the encoder 40 then creates a write address data and this address data is provided to the recording data. The recording data is recorded to the disc according to the provided address data.

In the case where the offset address does not exist, y is the recording address and calculated as described above from y=n(x−m)+m, where x is the absolute time address generated on the basis of the pregroove formed on the disc, n is the scale factor of the recording density, and m is the recording start address.

At the disc recording apparatus, from the data read from the disc prior to recording, the CPU 50 judges whether or not the offset address exists. The encoder 40 is controlled so that the recording address is calculated according to y=n(x−m)+m if the offset address does not exist, and according to z=y+p if the offset address exists.

According to the embodiment as described above, data is written at a predetermined scale factor on the basis of the ATIP obtained from the wobble signal. As a result, recording can be performed at a high density compared to an ordinary CD. On the other hand, during playback, the reading process from the sub Q code of the EFM signal that is read is controlled so that the disc rotational speed automatically slows according to linear velocity constant control so that ordinary playback can be performed. In particular, the object of this embodiment is audio CDs (CD-DA) so that playback, while dependent on the performance of the playback apparatus, is possible on ordinary CD players.

It is necessary for the CD itself to be a high precision medium that is compatible with high density recording. Although only an optical recording medium was used in the description above, the invention is applicable also to magneto-optical discs and other media.

In particular, according to the present invention, using a conventional general-purpose disc, a recording is possible at an arbitrary recording time instead of the recording time that has been predetermined for that disc.

Furthermore, the setting of the scale factor is designed to increase the recording capacity and ensure compatibility with ordinary CD players. In addition, if compatibility is ignored, it is possible to increase the recording capacity even further. Furthermore, by setting the scale factor to a value less than 1 and reducing the recording capacity, the recording quality can be improved.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A disc recording apparatus for recording data on a disc comprising a memory for storing data recovered from the disc, an interface for transferring recovered data from the memory to a communication line and providing data recovered from the communication line to the memory, a CPU for controlling an operation of the interface, and an encoder for encoding the recovered data from the memory and providing encoded data to the disc, the disc recording apparatus recording data with a recording address y calculated from $y=n(x-m)+m$, where x is an absolute time address generated on the basis of a pregroove formed on the disc, n is a scale factor of recording density having a value which exceeds 1 or is less than 1, and m is a recording start address.

2. The apparatus according to claim 1, wherein information regarding storage capacity for data storage on the disc is received, and on the basis of the received information, the scale factor n of recording density is determined.

3. The apparatus according to claim 2 comprising means for comparing the received information regarding storage capacity and a predetermined maximum storage capacity.

4. The apparatus according to claim 3, wherein if the predetermined maximum storage capacity is exceeded in a comparison of the received information regarding storage capacity and the maximum storage capacity, data indicating that recording is impossible is sent.

5. The apparatus according to claim 2, comprising means for comparing the received information regarding storage capacity and two predetermined maximum storage capacities.

6. The apparatus according to claim 2, wherein the received information regarding storage capacity is sent from an external computer.

7. The apparatus according to claim 1, wherein the n is greater than 1 and less than or equal to 1.2.

8. The apparatus according to claim 7, wherein if scale factor n that is determined on the basis of received information exceeds 1.2, a response is sent indicating that recording at that scale factor n is impossible.

9. A disc recording apparatus for recording data to a disc comprising a memory for storing data recovered from the disc, an interface for transferring recovered data from the memory to a communication line and providing data recovered from the communication line to the memory, a CPU for controlling an operation of the interface, and an encoder for encoding the recovered data from the memory and providing encoded data to the disc, the disc recording apparatus recording data with a recording address y calculated as $y=n(x+m)+m$ in the case where an offset address does not exist, where x is the absolute time address generated on the basis of a pregroove formed on the disc, n is the scale factor of recording density having a value which exceeds 1 or is less than 1, and m is the recording start address, and the recording address z calculated as $z=y+p$ in the case where recording is performed with the offset address, where p is the offset address.

10. The apparatus according to claim 9, wherein information regarding storage capacity of the disc for recording data is received, and the scale factor n of recording density is determined on the basis of the received information.

11. The apparatus according to claim 10 comprising means for comparing the received information regarding storage capacity and a predetermined maximum recording capacity.

12. The apparatus according to claim 11, wherein if the predetermined maximum storage capacity is exceeded in a comparison of the received information regarding storage capacity and the maximum storage capacity, data indicating that recording is impossible is sent.

13. The apparatus according to claim 10, comprising means for comparing the received information regarding storage capacity and two predetermined maximum storage capacities.

14. The apparatus according to claim 10, wherein the received information regarding storage capacity is sent from an external computer.

15. A disc recorded with data comprising data recorded with y as a recording address calculated from $y=n(x+m)+m$, where x is an absolute time address generated on the basis of a pregroove formed on the disc, n is a scale factor of recording density having a value which exceeds 1 or is less than 1, and m is a recording start address.

16. The disc according to claim 15, wherein the n is greater than 1 and less than or equal to 1.2.

17. A method for recording data comprising calculating a recording address y using $y=n(x+m)+m$, where x is an absolute time address generated on the basis of a pregroove formed on a disc, n is a scale factor of recording density having a value which exceeds 1 or is less than 1, and m is a recording start address.

18. The method according to claim 17 further comprising determining the scale factor n of recording density on the basis of information regarding storage capacity for data storage on the disc received.

19. The method according to claim 18 further comprising comparing the received information regarding storage capacity and a predetermined maximum storage capacity.

20. The method according to claim 19 further comprising sending data indicating that recording is impossible if the predetermined maximum storage capacity is exceeded in a comparison of the received information regarding storage capacity and the maximum storage capacity.

21. The method according to claim 17 further comprising comparing the received information regarding storage capacity and two predetermined maximum storage capacities.

22. The method according to claim 18 further comprising sending the received information regarding storage capacity from an external computer.

* * * * *